United States Patent [19]

Swartley et al.

[11] 4,390,551
[45] Jun. 28, 1983

[54] HEATING UTENSIL AND ASSOCIATED CIRCUIT COMPLETING POUCH

[75] Inventors: John S. Swartley, Westport; Suren Der Avedisian, Norwalk, both of Conn.

[73] Assignee: General Foods Corporation, White Plains, N.Y.

[21] Appl. No.: 232,764

[22] Filed: Feb. 9, 1981

[51] Int. Cl.³ .................. B65B 29/08; H05B 3/00; F27D 11/00; B65D 81/34

[52] U.S. Cl. .................. 426/107; 99/359; 219/387; 219/438; 219/521; 219/535; 229/3.5 MF; 229/53; 426/113; 426/412

[58] Field of Search .............. 426/107, 113, 126, 237, 426/244, 243, 523, 412; 219/386, 387, 383, 384, 524, 525, 535, 385, 521, 436, 438; 99/359; 229/3.5 MF

[56] References Cited

U.S. PATENT DOCUMENTS

| 1,693,974 | 12/1928 | Bienstock | 99/413 |
|---|---|---|---|
| 2,633,284 | 3/1953 | Moffett et al. | 426/113 |
| 2,839,662 | 6/1958 | Theisen | 219/436 |
| 2,844,695 | 7/1958 | McLean | 426/107 |
| 3,071,307 | 1/1963 | Keller | 426/412 |
| 3,210,199 | 10/1965 | Schlaf | 426/107 |
| 3,330,203 | 7/1967 | Korr | 219/385 |
| 3,381,115 | 4/1968 | Welch | 219/387 |
| 3,489,075 | 1/1970 | O'Reilly | 99/413 |
| 3,547,660 | 12/1970 | Weissberg | 426/113 |
| 3,573,430 | 4/1971 | Eisler | 219/385 |
| 3,678,248 | 7/1972 | Tricault et al. | 219/387 |
| 3,757,673 | 9/1973 | Wallace | 99/410 |
| 3,797,642 | 3/1974 | Dobry | 426/82 |
| 3,804,965 | 4/1974 | Peters | 426/523 |
| 3,814,900 | 6/1974 | Frey et al. | 219/385 |
| 3,819,089 | 6/1974 | Scales | 99/413 |
| 3,830,148 | 8/1974 | Shevlin | 219/387 |
| 3,876,812 | 4/1975 | Peters | 426/523 |
| 3,886,290 | 5/1975 | Theimer et al. | 426/107 |
| 3,974,358 | 8/1976 | Goltsos | 219/387 |
| 4,100,302 | 7/1978 | Theimer et al. | 426/107 |
| 4,215,629 | 8/1980 | Janssen | 99/410 |

FOREIGN PATENT DOCUMENTS

| 767768 | 10/1971 | Belgium | 426/234 |
|---|---|---|---|
| 508287 | 1/1920 | France | 99/413 |
| 1115174 | 12/1955 | France | 99/413 |
| 207023 | 11/1923 | United Kingdom | 99/413 |
| 1109794 | 4/1968 | United Kingdom | 426/411 |
| 1535517 | 12/1978 | United Kingdom | 426/234 |

*Primary Examiner*—Steven L. Weinstein
*Attorney, Agent, or Firm*—Daniel J. Donovan; Bruno P. Struzzi; Thomas V. Sullivan

[57] ABSTRACT

An arrangement for allowing comestible products to be conveniently heated in a disposable pouch. A kitchen utensil is constructed with a top rim shaped to support the disposable pouch containing a packaged comestible. The disposable pouch has an outer periphery at least as large as that defined by the top rim of the utensil such that the pouch is supported by the top rim of the utensil while it is being heated therein. In a first embodiment, an electrical heating element is provided as an integral part of the base of the utensil, while in a second embodiment a cover for the utensil also has an electrical heating element constructed as an integral part thereof. In several embodiments, the pouch has one or more electrical contacts to complete circuits to the heating elements such that the latter cannot be activated until a pouch is properly placed on the utensil.

1 Claim, 8 Drawing Figures

U.S. Patent   Jun. 28, 1983   Sheet 3 of 3   4,390,551

HEATING UTENSIL AND ASSOCIATED CIRCUIT COMPLETING POUCH

BACKGROUND OF THE INVENTION

1. Field of the Invention

The present invention relates generally to the art of packaged food products sealed in flexible bags in which they are adapted to be heated prior to serving.

More particularly, the subject invention relates to novel packaged food items adapted to be electrically heated prior to consumption thereof. In greater detail, the present invention relates to a unique arrangement for heating comestibles packaged in a disposable pouch.

2. Discussion of the Prior Art

Comestibles packaged in disposable pouches are normally adapted to be heated in a pot of boiling water while the food product remains in the pouch so that the product is not diluted by or mixed with water in the pot. Generally, food containing bags of the type described herein are completely immersed in a pot of hot water, and after the food product is heated through the walls of the bag, the heated water is poured from the pot and a corner of the bag is opened to pour out the contents thereof. Several meat and vegetable products are now offered commercially for preparation in this manner.

Moreover, efforts have been made in recent years to develop inexpensive, disposable containers or wrappers equipped with electrical resistance heating elements so that food products packaged therein may be electrically heated to serving temperatures. An arrangement of this nature dispenses with the use of ranges and conventional cooking equipment in the preparation for service of such products. However, these efforts have been largely unsuccessful because, among other factors, the expense of providing each individual pouch with a separate heating element has severely limited the marketability and greatly offset the advantages of food packages having self-contained heating elements as an integral part thereof. Packaging arrangements of the type discussed herein are disclosed by Eisler U.S. Pat. No. 3,100,711 and Theimer et al. U.S. Pat. No. 3,886,290.

Clarke U.S. Pat. No. 3,552,379 is considered to be somewhat pertinent to the present invention by disclosing a food preparation arrangement having a first tray-type receptacle for food products and a heater therefor comprising a second tray of dimensions similar to the food tray and adapted to support the same. A combustible material is positioned in the second tray, which also has air intake opening in its sidewalls near the bottom and pressed out portions in its sidewalls extending to the top edge thereof. These openings form vents for the products of combustion, and also serve to direct heat uniformly throughout the lower surface of the food receptacle and around the sidewalls thereof. This patent is considered to be pertinent to the extent that it discloses a heater tray formed as a separate article which may or may not be sold with the food tray. In greater particularity, this patent states that the heater tray may be made in sizes to receive standard trays containing complete meals, known in the trade as TV dinners. A user may provide himself with a number of heater trays, and use them with any of the numerous TV dinners now commercially available, and after usage dispose of the heater tray as he disposes of the food tray. However, it is apparent that this patent is quite distinct from the present invention in that it is not concerned with an electrically heated nondisposable type of appliance or with comestibles packaged in disposable pouches.

SUMMARY OF THE INVENTION

Accordingly, it is an object of the present invention to provide a food packaging arrangement which may be readily connected to a conventional electrical outlet or to an extension thereof for heating of comestible products packaged in pouches contained therein, but wherein the comestible pouch does not have any special electrical heating equipment associated therewith. In this connection, it is an object of the present invention to provide an inexpensive and disposable container adapted to enclose a food product for marketing, storing and subsequent heating of that product, and wherein an associated kitchen utensil is provided with an electrical heater for heating the product to a serving temperature.

The storage of comestible products in a disposable pouch has a number of advantages when compared with more conventional storage arrangements, including the following. Refrigeration of the stored comestibles is not required as the retort package is quite shelf stable. Shelf life of comestibles packaged in this manner has been stated to be two years, but experience with such pouches has indicated an indefinite storage period. The cost of raw materials used in a pouch compares favorably with a labeled metal can, and moreover the economics thereof should improve further with continued development. The weight of a package is approximately ten percent that of metal can container. Weight savings in containerization are particularly significant in those market segments wherein transportation costs are high. The requirements for empty container storage are also reduced when compared to more conventional containers. Comestible products stored in disposable pouches are extremely convenient to use, and the container may be heated prior to opening, thereby eliminating messy kitchen utensil clean up. And perhaps, most significantly, the resultant heated comestible products are claimed by many food technologists to be frequently better than canned products and superior to most frozen comestibles.

Moreover disposable pouches are extremely flexible, and may be used to store a large variety of comestible products such as stews, ravioli, spaghetti, and various meats and vegetables such as french fries.

A package of this nature must meet a number of demanding design requirements including the following. The pouches must be capable of surviving the elevated temperatures employed in sterilizing the sealed package. It must also be capable of withstanding the physical jarring and abuse encountered in normal food distribution channels. Moreover, the packages must exhibit chemical stability and structural integrity not required in less sophisticated flexible containers. Moreover, the U.S. Federal government has issued guidelines which include but are not limited to pouch integrity, bond strengths of the laminated materials, seal tensile strengths and burst test requirements. In general, the aforementioned design requirements would be easier to meet in a pouch which does not include an electrical heating element as an integral part thereof.

In view of the foregoing, the present invention contemplates the provision of an arrangement for allowing comestible products to be conveniently heated in a disposable pouch package. In a first embodiment of the subject invention, a permanent kitchen utensil is constructed with an electrical heater as an integral part of the base thereof, and has a top rim shaped to support a disposable pouch containing the packaged comestible.

In accordance with a further aspect of the present invention, a utensil cover may be placed over the pouch such that the outer periphery of the pouch is held in position between the utensil cover and the top rim of the utensil with the retort pouch being suspended in the utensil over the electrically heated base. Moreover the outer periphery of the pouch is larger than the dimensions of the top rim and cover such that the sides of the pouch project outwardly beyond the sides of the utensil.

In accordance with the teachings of a second embodiment herein, a second electrical heating element is formed as an integral part of the cover for the utensil. The disposable pouch has an electrical contact formed as an integral part thereof which functions to complete a circuit for a heating element located in the appliance externally of the pouch. The arrangement is such that the heating element cannot be activated until a pouch is properly positioned in the utensil.

Accordingly, a primary object of the present invention is to provide a comestible packaging arrangement in which food products are stored in a disposable pouch which may be heated in a permanent kitchen appliance provided for that purpose, and then the pouch may be conveniently disposed of without resulting in any messy cleaning requirements.

BRIEF DESCRIPTION OF THE DRAWINGS

The foregoing and other objects and advantages of a novel heating arrangement for comestible products constructed pursuant to the teachings of the present invention may be more readily understood by one skilled in the art, having reference to the following detailed description of several preferred embodiments thereof, taken in conjunction with the accompanying drawings in which identical reference numerals are utilized to refer to like elements throughout the several views, and in which.

DETAILED DESCRIPTION OF THE DRAWINGS

Figure 1:
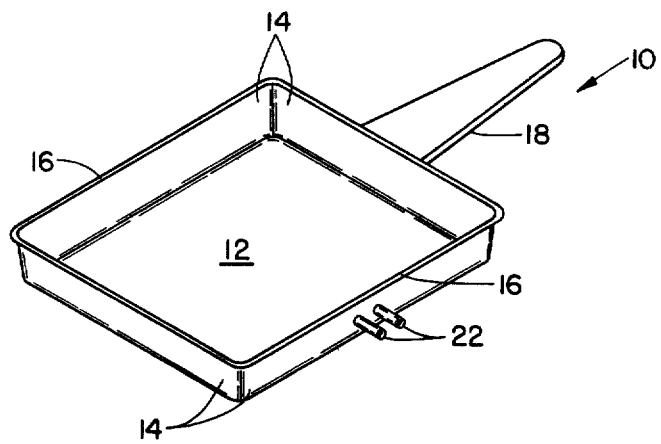
FIG. 1 is a perspective view of a kitchen utensil constructed pursuant to the teachings of a first embodiment herein.

Referring to the drawings in detail, FIG. 1 illustrates a perspective view of a kitchen utensil 10 having a substantially flat rectangular or square shaped base 12. Four side walls 14 terminate at their upper edges in a top rim 16 extending around the top periphery of the appliance. An elongated handle 18 is provided projecting from one side wall 14, and provides a convenient means for a user to grasp the utensil.

Figure 2:
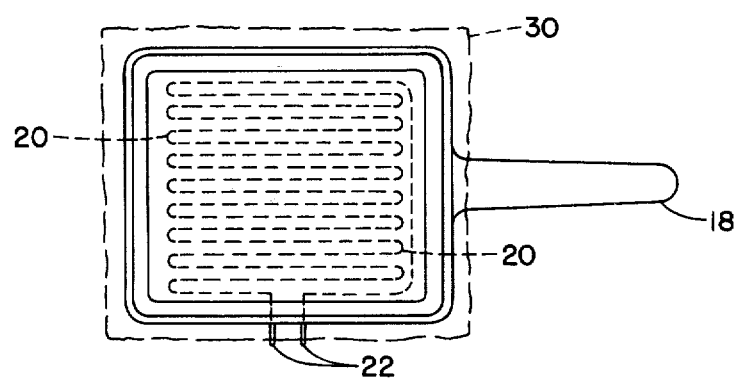
FIG. 2 illustrates a plan view of the kitchen utensil of FIG. 1, also showing in dashed lines a disposable pouch placed on top thereof.

FIG. 2 is a plan view of the utensil, and shows a resistance heating element 20 provided in the base 12 in the formation of a regular array to provide even heating across the base. The heating element terminates in two prong contacts 22 provided in one side wall 14 adapted to provide a connection to an electrical connector at one end of an electrical power cord in a standard fashion. In alternative embodiments the ohmic heating element 20 may terminate directly in an electrical power cord coupled permanently to the appliance. Also in further embodiments the resistance heating element 20 may be replaced by other alternative electrical heaters such as electrical grids, etc., which may be provided either encased in the interior of the base 12, or embedded in the surface of the base, or even provided on the surface thereof.

An appliance cover 24, having a knob 26 to enable convenient handling therof, is also provided for the utensil to retain therein the heat generated by the ohmic heater 20.

The utensil 10 and cover 26 may be manufactured in a conventional manner from standard materials such as aluminum, copper, brass, porcelain, etc., and may or may not be provided with a nonslip interior surface formed from Teflon ® or an equivalent material.

A comestible product 28 which is to be heated by the utensil 10 is provided in a disposable pouch 30 having an outer periphery matching the shape of the utensil, but being slightly larger than that of the utensil such that the pouch may be placed on the top rim 16 of the side walls and is supported in place thereby. The gauge and stiffness of the material forming the pouch is selected for the size of the utensil and the type and weight of the comestible packaged therein such that it supports the pouch above the base 12 of the utensil, as illustrated clearly in FIG. 3. The pouch may be manufactured in a conventional manner from standard, suitable materials such as aluminum foil laminated with polyolefin and polyester, polypropylene, polyester, a laminate of polyamide and polyethylene, etc.

The appliance top 24, in addition to retaining generated heat in the utensil, also serves to hold the pouch 30 in place on the top rim of the utensil.

Figure 3:
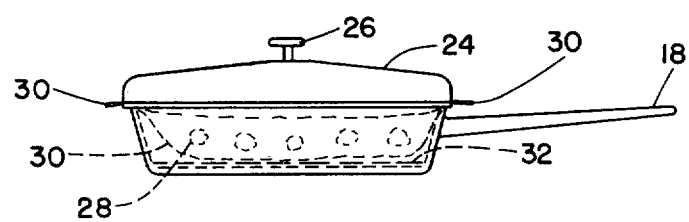
FIG. 3 is an elevational view of the embodiment of FIGS. 1 and 2 wherein the kitchen utensil has a top cover placed thereon, and the disposable pouch is illustrated in dashed lines.

In operation of the first embodiment of the present invention, the utensil is placed on a level convenient location. A quantity of water 32 may or may not be poured into the utensil. A pouch having a desired comestible product therein is then placed on the top rim of the utensil, as illustrated in FIGS. 2 and 3. The appliance cover 24 is optionally placed on the top rim 16 such that it covers the edges of the pouch. The utensil is then plugged into an electrical outlet for a sufficient amount of time to heat the food products to a proper serving temperature. The package is then opened, the comestible served therefrom, and the pouch disposed of without resulting in any messy cleaning requirements.

The pouch may be provided with a weakened line along one edge to facilitate opening thereof. Alternatively, one or more of the edges of the top rim may be somewhat sharpened to assist in opening thereof.

Figure 4:
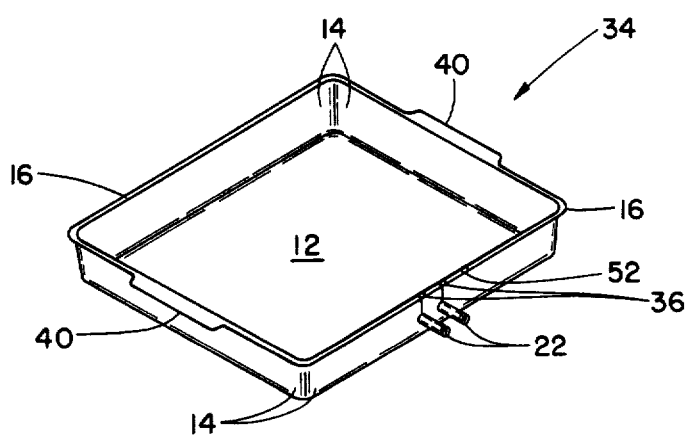
FIG. 4 illustrates a perpective view of a kitchen utensil constructed according to the teachings of a second embodiment of the present invention.

FIG. 4 is a perspective view of a second embodiment of the present invention wherein a kitchen utensil 34 is similar to appliance 10, but rather than an elongated handle 18, it has two abbreviated integrally formed side handles 40 similar to a casserole dish. Two electrical prong connectors 22 are provided for appropriate connection to an AC power supply. The base 12 of the appliance may have an electrical heating element formed as an integral portion thereof which is connected directly to prong connectors 22, or may be connected in an alternate fashion as described below.

Figure 5:
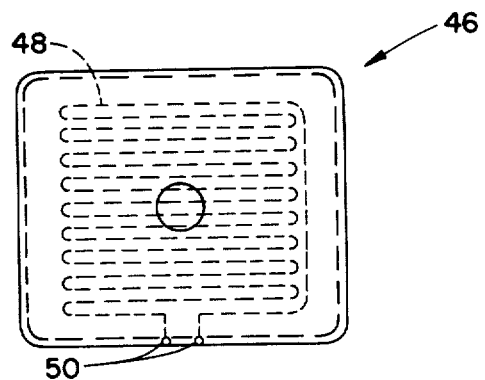
FIG. 5 is a plan view of a top cover adapted to be placed on top of the utensil of FIG. 4 and having a separate heating element therein.
Figure 6:
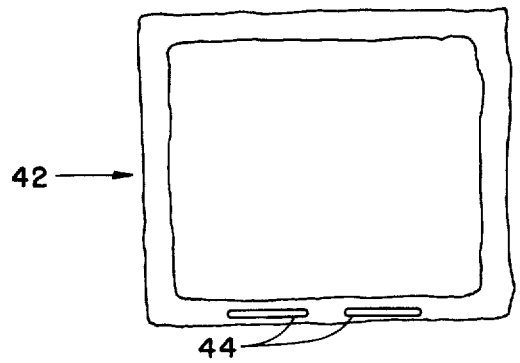
FIG. 6 is a plan view of a disposable pouch designed to be utilized with the utensil and cover of FIGS. 4 and 5.

A comestible product packaged in a disposable pouch 42, as shown in FIG. 6, is adapted to be heated on appliance 34, and is similar to that illustrated in FIG. 2. However, pouch 42 also includes two elongated electrical contact strips 44 positioned along one edge thereof to complete an electrical circuit in the appliance. A cover 46, as illustrated in FIG. 5, is provided to be placed on top of pouch 42, and includes an electrical heating element 48 formed integrally therewith. Heating element 48 may be similar in concept to heating element 20 and the several variations thereof as mentioned above. Heating element 48 terminates in two electrical contacts 50 provided on the bottom of one edge of cover 46.

Electrical contacts 50 are adapted to form an electrical connection to the upper outer portions of contact strips 44 in disposable pouch 42, while electrical contacts 36 are adapted to form an electrical connection to the lower inner portions of contact strips 44. Accordingly, when cover 46 is placed on top of a pouch 42 positioned on casserole appliance 34, a completed electrical circuit is formed through the contacts to the electrical heater element 48 for its activation.

The embodiment illustrated in FIGS. 4 through 6 operates to heat the comestible product in pouch 42 from both the bottom and top, and accordingly applies a substantially even heat to the comestible. Moreover, the heating element 48 in cover 46 can be activated only when a disposable pouch is properly positioned in the appliance as contacts 50 are offset with respect to contacts 36, and accordingly can form a completed circuit with them only through the intermediary of contact strips 44.

Figure 7:
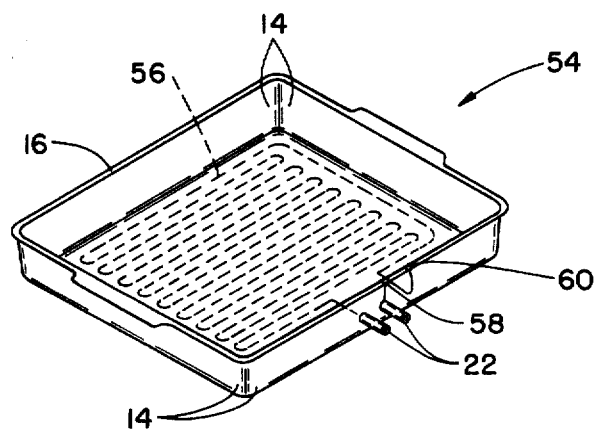
FIG. 7 illustrates a further embodiment of a kitchen utensil constructed pursuant to the teachings of the present invention.
Figure 8:
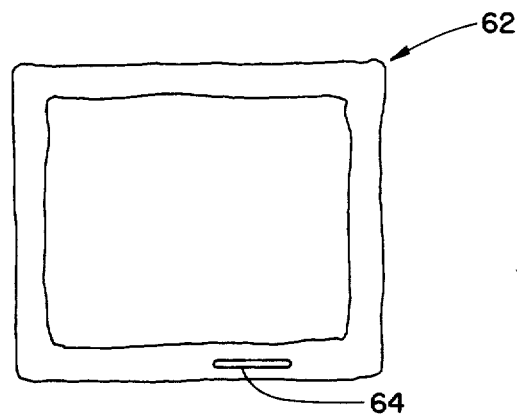
FIG. 8 is a plan view of a disposable pouch designed to be utilized with the utensil of FIG. 7.

In a variation of the embodiment explained thus far, the bottom heating element may have one side coupled directly to one contact 22 and the other side activated through a further contact 52 adapted to form an electrical connection to the bottom outer edge of a contact strip 44. In this embodiment, neither the bottom heating element nor the top heating element is actuated until a disposable pouch is properly positioned in the kitchen utensil 34. A further variation of this embodiment is illustrated in FIGS. 7 and 8 wherein one side of heating element 56 is connected to contact 60 which is adapted to form an electrical connection with contact strip 64 in disposable pouch 62. In this embodiment the cover of the kitchen utensil is not heated.

A further embodiment of the present invention, not illustrated, is similar in concept to electrical hamburger maker appliances which are now commercially available. In this embodiment the heating elements in the top and bottom of the appliance, which would be suitably shaped for a disposable pouch, would be actuated only through the placement therein of a pouch having only a single small contact area positioned between corresponding contacts in the upper and lower portions of the appliance. The contacts in the upper and lower sides of the appliance may be offset or spaced vertically from each other such that the heating elements are actuated only when a disposable pouch is properly positioned in the appliance.

In preferred forms of the embodiments described above, the active electrical contacts such as 36 and 58 and the top contact area of contact strips 44 and 64 are recessed to prevent contact with a user. One preferred form of recessed contact would be a snap button type of contact such as those applied to a typical 9 volt battery. Further, those areas of contact strips 44 and 64 which do not form an electrical connection are preferably covered by a dielectric material. It should be noted that the contact strips are positioned along an edge of the pouch so they should not adversely affect the integrity of the pouch and the packaged comestible.

Moreover, in some embodiments the electrical appliance and disposable comestible bearing pouches may be uniquely shaped such that the pouch may be placed in the appliances in only one position which is the proper position for the electrical contact(s) therein.

While several embodiments and variations thereon have been described in detail, it should be apparent that the disclosure and teachings herein will suggest many alternative embodiments to those skilled in this art.

What is claimed is:

1. The combination of an electrical kitchen utensil and a disposable pouch for use in said utensil, said combination comprising:
   a. an electrical kitchen utensil, said utensil having;
      i. a lower member having a substantially horizontal top rim for supporting said disposable pouch above a bottom of said utensil;
      ii. a cover for said lower member, said cover defining an opening which matches the horizontal rim of said utensil, said cover cooperating with said rim to clamp a flange portion of the disposable pouch therebetween and suspend the pouch above the bottom of the utensil;
      iii. an electrical heating means incorporated in said utensil for heating the interior of the utensil and the comestible product in said disposable pouch,
      iv. a first electrical contact means arranged adjacent the rim of said lower member, said contact means interrupting an electrical circuit that energizes said heating means;
   b. a disposable pouch without a heating element for use with said utensil, said pouch having:
      i. a first and second layer of fluid impervious flexible material, said comestible product being packaged between said layers,
      ii. a flange member extending outwardly on all sides of said pouch, said flange member having a larger perimeter than the perimeter of said utensil rim;
      iii. a second electrical contact means positioned along one edge of the flange member said second contact means formed to bridge the first electrical contact means arranged adjacent the rim of the lower member to thereby close the electrical circuit and energize said heating means in the kitchen utensil.

* * * * *